US008643932B2

(12) United States Patent
Ikeda (10) Patent No.: US 8,643,932 B2
(45) Date of Patent: Feb. 4, 2014

(54) REFLECTION TYPE DISPLAY APPARATUS AND METHOD FOR DRIVING THIS APPARATUS

(75) Inventor: Hajime Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 988 days.

(21) Appl. No.: 12/170,544

(22) Filed: Jul. 10, 2008

(65) Prior Publication Data

US 2009/0021472 A1    Jan. 22, 2009

(30) Foreign Application Priority Data

Jul. 18, 2007 (JP) ................................. 2007-187104
Jan. 16, 2008 (JP) ................................. 2008-006900
Jul. 1, 2008 (JP) ................................. 2008-172623

(51) Int. Cl.
*G02F 1/153* (2006.01)
*G09G 3/19* (2006.01)

(52) U.S. Cl.
USPC ........................................... 359/267; 345/49

(58) Field of Classification Search
USPC ........ 345/48, 55, 105, 205, 107, 49; 349/122; 359/265–267; 205/334
See application file for complete search history.

(56) References Cited

U.S. PATENT DOCUMENTS

| | | | | |
|---|---|---|---|---|
| 6,392,618 | B1* | 5/2002 | Kimura ........................... | 345/85 |
| 2003/0095094 | A1* | 5/2003 | Goden ........................... | 345/107 |
| 2003/0164915 | A1* | 9/2003 | Fujiwara et al. ............... | 349/122 |
| 2003/0218791 | A1* | 11/2003 | Okura et al. ................... | 359/267 |
| 2004/0036951 | A1* | 2/2004 | Johnson et al. ................ | 359/296 |
| 2005/0087448 | A1* | 4/2005 | Takahashi ...................... | 205/334 |
| 2006/0007529 | A1* | 1/2006 | Mizuno .......................... | 359/296 |
| 2006/0028707 | A1* | 2/2006 | Shinozaki et al. ............. | 359/265 |
| 2006/0097982 | A1* | 5/2006 | Arai et al. ...................... | 345/105 |
| 2006/0152438 | A1* | 7/2006 | Tanaka ............................ | 345/48 |
| 2007/0109218 | A1* | 5/2007 | Saito et al. ...................... | 345/55 |
| 2007/0119048 | A1* | 5/2007 | Li et al. .......................... | 29/623.5 |
| 2007/0126695 | A1* | 6/2007 | Kishi ............................. | 345/107 |

FOREIGN PATENT DOCUMENTS

JP    11-101994    4/1999
JP    2004-170850    6/2004

* cited by examiner

*Primary Examiner* — Chanh Nguyen
*Assistant Examiner* — Sanghyuk Park
(74) *Attorney, Agent, or Firm* — Fitzpatrick, Cella, Harper & Scinto (57) ABSTRACT

A reflection type display apparatus includes an image display having a plurality of pixels, with each of the pixels including a first electrode having a light transmitting property, a second electrode disposed in opposition to the first electrode, and a third electrode disposed in opposition to the first or second electrode. An electrolytic solution containing a metal ion is disposed in contact with the first, second and third electrodes, and a control unit sets a direction of a current flowing between the first, second and third electrodes. The control unit sets a first state of forming a first electroplating of a first color on the first electrode using the first electrode as a negative electrode and using the second electrode as a positive electrode, a second state of forming a second electroplating of a second color on the second electrode using the second electrode as the negative electrode and using the first electrode as the positive electrode without forming the first electroplating, and a third state of forming a third electroplating of a third color on the third electrode using the third electrode as the negative electrode and using the first and second electrodes as the positive electrodes without forming the first and second electroplatings.

16 Claims, 9 Drawing Sheets

REFLECTION TYPE DISPLAY APPARATUS AND METHOD FOR DRIVING THIS APPARATUS

BACKGROUND OF THE INVENTION

1. Field of the Invention

The present invention relates to a reflection type display apparatus and a driving method for this apparatus, and particularly relates to a reflection type display apparatus that employs electroplating to modulate light, and a driving method for this apparatus.

2. Description of the Related Art

Electronic paper has been actively developed as a display apparatus that possesses high visual recognition property and low-power consumption. An example wherein color filters are assembled with a display apparatus that employs electroplating is described in Japanese Patent Application Laid-Open No. H11-101994. According to Japanese Patent Application Laid-Open No. H11-101994, a silver halide solution is provided between an operating electrode and an opposed electrode, the color filters are arranged on the incident side of the operating electrode (opposite the side whereat the silver halide solution is provided), and a white background plate is arranged on the opposed electrode (on the side whereat the silver halide solution is provided). When silver is to be deposited on the operating electrode, the silver to be deposited is employed to absorb light that enters via the color filters. When the deposition of silver on the operating electrode is inhibited, however, light that enters via the color filters is transmitted through the operating electrode and is reflected by the white background plate, and the reflected light is then transmitted through the operating electrode and the color filters to provide a color display.

SUMMARY OF THE INVENTION

According to the structure described in Japanese Patent Application Laid-Open No. H11-101994, incident light first passes through the color filters and is then reflected at a reflection layer. Consequently, for white to be displayed, pixels for the three primary colors must be provided for this structure. These individual pixels reflect light only of one color, and the incident light of those color elements that are not reflected is absorbed by the color filters provided for the individual pixels. For example, a pixel that reflects red absorbs blue and green elements of incident light, a pixel that reflects blue absorbs red and green elements, and a pixel that reflects green absorbs blue and red elements. Therefore, on a white color display, the red element is absorbed by the blue and green pixels, the blue element is absorbed by the red and green pixels, and the green element is absorbed by the red and blue pixels. That is, the area available for the reflection of red constitutes only ⅓ of the total display area, a reflection limitation that also applies to the colors green and blue. Thus, since each of the individual colors is reflected by only ⅓ of the display area, the total reflectance efficiency of a white color display is only ⅓, relative to the effective reflection area ratio available for each of the individual colors, and an increased color reflectance is desirable.

One objective of the present invention is to provide a reflection type display apparatus that ensures a high reflectance for a white color display that can exhibit colors.

According to the present invention, a reflection type display apparatus, for which electroplating for modulating light is performed, comprises: a first electrode having a light transmitting property; a second electrode disposed in opposition to the first electrode; a third electrode disposed in opposition to the first or the second electrode; an electrolytic solution containing a metal ion and disposed so as to contact the first, second and third electrodes; and a control unit for setting a direction for a current flowing between the first, the second and the third electrodes. The control unit sets a first state of forming a first electroplating of a first color on the first electrode using the first electrode as a negative electrode and the second electrode as positive electrodes, a second state of forming a second electroplating of a second color on the second electrode using the second electrode as the negative electrode and the first electrode as the positive electrodes without forming the first electroplating, and a third state of forming a third electroplating of a third color on the third electrode using the third electrode as the negative electrode and the first and the second electrodes as the positive electrodes without forming the first and second electroplatings.

Furthermore, according to the present invention, a driving method, for a reflection type display apparatus that includes a first electrode having a light transmitting property, a second electrode disposed in opposition to the first electrode, a third electrode disposed in opposition to the first or the second electrode, and an electrolytic solution, which contains a metal ion, that is disposed to contact the first, the second and the third electrodes, comprises: a first mode of forming a first electroplating of a first color on the first electrode by changing a direction of a current flowing between the first electrode, the second electrode and the third electrode; a second mode of forming a second electroplating of a second color on the second electrode without forming the first electroplating on the first electrode; a third mode of forming an electroplating on the third electrode, without forming the first and second electroplatings on the first and second electrodes.

According to the arrangement of the display apparatus of this invention, since the electroplating of different colors is separately performed for the first and the second electrodes, the first color, which is an electroplating color deposited on the first electrode, and the second color, which is an electroplating color deposited on the second electrode, can both be displayed on the display apparatus. Furthermore, when an electroplating color is to be deposited on the third electrode, deposition of this third color can be performed in a state wherein electroplating has not been used to deposit colors on the first and the second electrodes.

When the second electrode is made of a material that reflects light within a specific wavelength band range, the color of the second electrode is itself presented as the third color. And when the second electrode is made of a transparent material, a reflector that reflects light within a specific wavelength band range need only be laminated on the second electrode for a specific color to be displayed.

As a more specific example, a display apparatus can be provided that displays white as the first color and black as the second color, and that employs a transparent electrode as the second element and determines the third color using a reflector. During the deposition, using electroplating, of white as the first color on the first electrode, a high reflectance of incident light can be achieved because wavelength selection is not performed. Especially, when compared with a conventional example, incident light across all the wavelength band ranges is reflected without being absorbed by color filters, for example, and therefore, the display and reflectance of white is high. Similarly, black, which is the second color, and a third color obtained by the reflector can be displayed. When the above described states are employed together, a display apparatus can be provided that can present a high reflectance white display as well as a color display.

Further features of the present invention will become apparent from the following description of exemplary embodiments with reference to the attached drawings.

DESCRIPTION OF THE EMBODIMENTS

Figure 1:
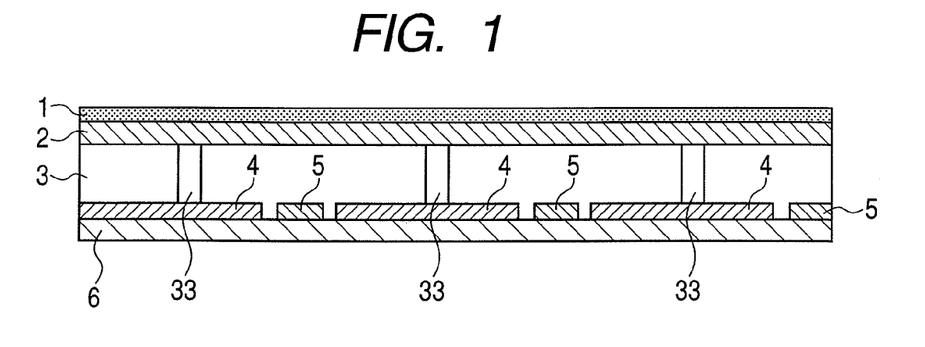
FIG. 1 is a diagram illustrating the basic arrangement of a reflection type display apparatus according to one embodiment of the present invention.
Figure 7:
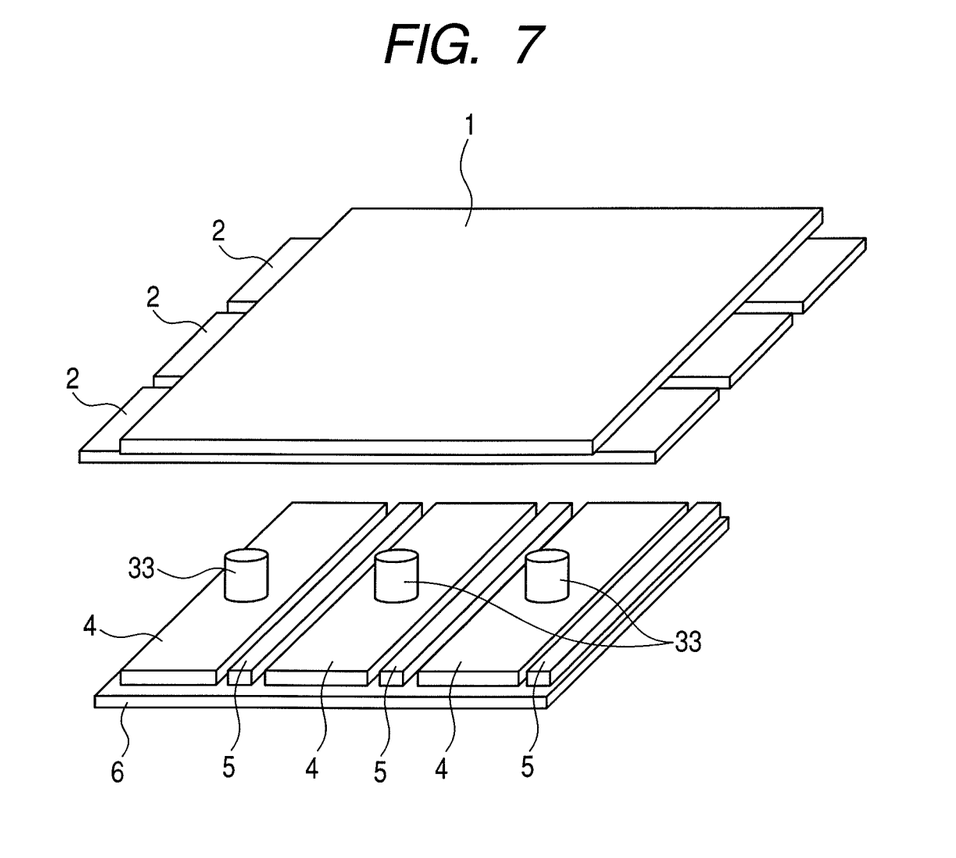
FIG. 7 is a perspective view of the reflective type display apparatus when performing passive matrix driving.

FIG. 1 is a cross-sectional view, according to a first embodiment of the preset invention, of a reflection type display apparatus, the structure of which will now described while referring to FIG. 1, and FIG. 7 is a perspective view of the reflection display apparatus for performing passive matrix driving. The reflection type display apparatus of this embodiment may function as either a massive matrix driving or an active matrix driving type, and the structure in FIG. 1 is employed in common for passive matrix driving and active matrix driving.

The reflection type display apparatus includes: a transparent supporting substrate 1 for protecting the obverse face; a transparent, first electrode 2; colored, second electrodes 4, which are located opposite to and facing the first electrode 2 across an intervening electrolytic solution 3; third electrodes 5, which, as do the second electrodes 4, face the first electrode 2 across the intervening electrolytic solution 3; and a supporting substrate 6. The electrolytic solution 3 is a metal ion fluid suspension, and the supporting substrate 1 serves as a second substrate while the supporting substrate 6 serves as a first substrate. And to maintain a constant distance between these supporting substrates 1 and 6, arbitrarily formed spacers 33, such as cylinders, spheres or quadrangular prisms, are positioned between them. Furthermore, it is preferable that the supporting substrate 1 and the first electrode 2 be transparent. This, however, is not an absolute requirement, since so long as the materials used for them exhibit a satisfactory light conducting property, these two components may be translucent.

In FIG. 7, the colored, second electrodes 4 are arranged on the supporting substrate 6, along multiple lines, in a single direction, and the third electrodes 5 are arranged on the supporting substrate 6, along multiple lines, parallel to the second electrodes 4. In this embodiment, since the third electrodes 5 are not related to display, they are formed of fine wires that are narrower than those used for the second electrodes 4. In this instance, however, when electroplating is performed for the third electrodes 5 at the same time as electroplating is performed for the second electrodes 4, the third electrodes 5 can be employed for display.

The transparent, first electrodes 2 are located on the transparent supporting substrate 1, along multiple lines, in a direction (defined as a Y direction) perpendicular to an X direction, so that the first electrodes 2 cross the second electrodes 4, which are also located along multiple lines.

Figure 12A:
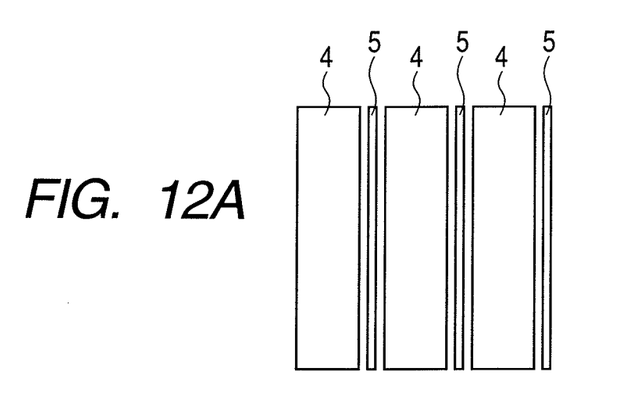
FIGS. 12A, 12B and 12C are plan views illustrating example electrode arrangements for the present invention.

The shapes of the electrodes 4 and 5 are not limited to those in FIG. 7. As illustrated in the plan view in FIG. 12B, electrodes 5, which have portions that are linearly projected to one side (to one side in the Y direction), can be arranged along multiple lines to form U shapes that enclose the electrodes 4. Further, as shown in the plan view in FIG. 12C, electrodes 5, which have portions that are linearly projected to either side (either side in the Y direction), can be arranged along multiple lines to enclose the electrodes 4 from both sides. FIG. 12A is a plan view of the electrodes 4 and the electrodes 5 illustrated in FIG. 7. The electrodes 5 can be scanned by individually selecting each line and causing a current to flow through it. As another operation, scanning of two selected lines can be performed at the same time by causing a current to flow through them, and the electrodes can be shifted line by line. To perform these operations, for example, a current can be supplied by the electrodes 4 to the electrodes 5 along the lines located along either edge.

Figure 12B:
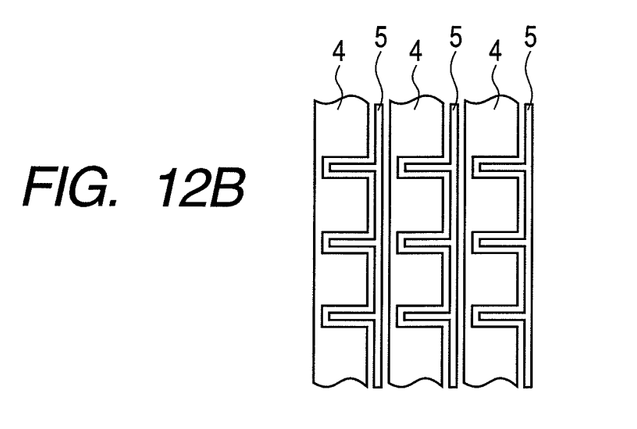
Figure 12C:
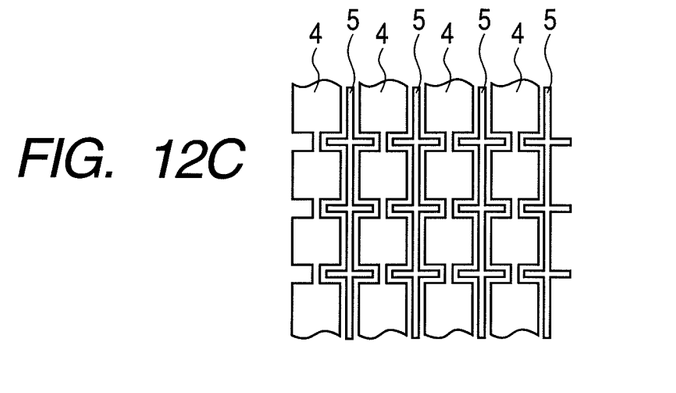

The arrangement illustrated in FIG. 12A, wherein an electrode 5 is arranged along one side of each electrode 4, the arrangement illustrated in FIG. 12B, wherein the electrodes 4 are enclosed by U shaped electrodes 5, and the arrangement illustrated in FIG. 12C, wherein the electrodes 4 are almost fully enclosed by the electrodes 5, can also be employed for an active matrix driving type display apparatus. It should be noted that for an active matrix driving type display an electrode 4 and an electrode 5 are provided for each pixel.

Figure 8:
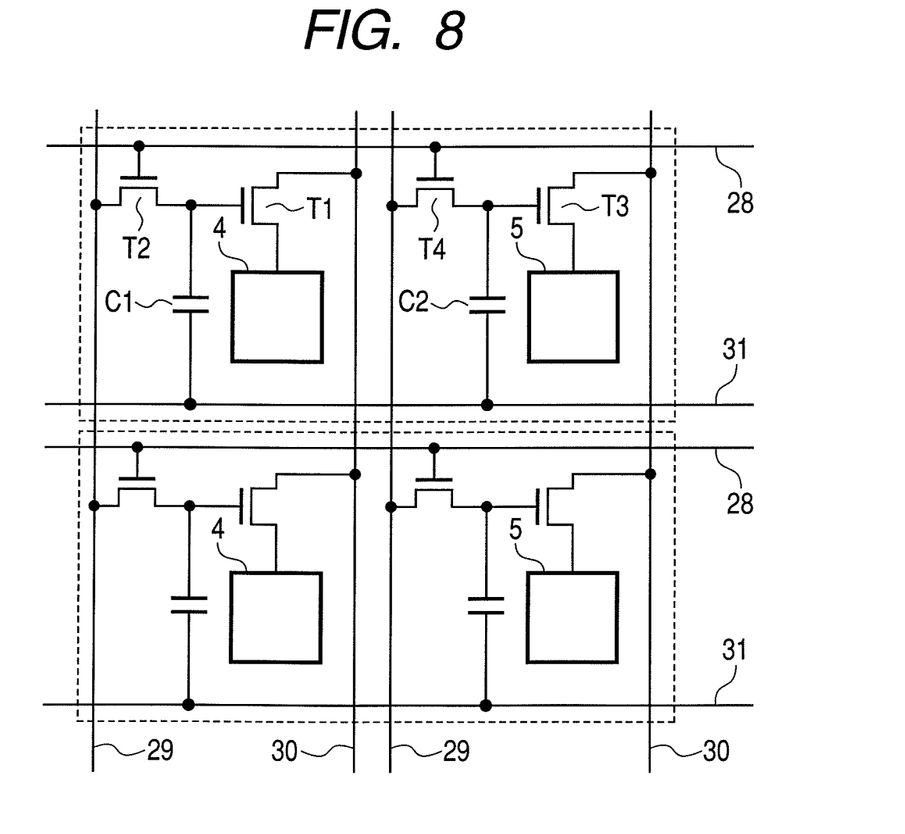
FIG. 8 is a circuit structure diagram illustrating the reflection type display apparatus according to the embodiment of the present invention for performing active matrix driving.

For a reflection type display apparatus that performs active matrix driving, as illustrated in FIG. 8, the electrodes 4 and the electrodes 5 are arranged for individual pixels, and are respectively connected to first switches T1 and third switches T3, which are thin film transistors. The electrode 2 is employed as a common electrode, and second switches T2 and fourth switches T4 are employed to render on or off the first switches T1 and the third switches T3, respectively. The second switches T2 and the fourth switches T4 are connected to the control terminals of the first switches T1 and the third switches T3 (or are connected to their gates when the switches are field effect transistors). The control terminals (or the gates when the switches are field effects transistors) of the second switches T2 and the fourth switches T4 are connected to scan lines 28 (or to gate lines when the switches are field effect transistors). When the second switches T2 and the fourth switches T4 are rendered on or off, data signals are transmitted along a data line 29 to the control terminals of the first switches T1 and capacitors C1, or to the third switches T3 and capacitors C2. Then, the data signals are stored in either the capacitor C1 or C2. The first to the fourth switches T1 to T4 are provided for individual pixels, and when the first and the third switches T1 and T3 are rendered on or off, a current having a predetermined current density flows through the first and third switches T1 and T3. A GND 31 is a ground line.

When a current is supplied by employing an electrode 2 as a negative electrode and electrodes 4 and 5 as positive electrodes, metal ions suspended in an electrolytic solution 3 are deposited on the surface of the electrode 4 through electrolytic reduction, and electroplating of the electrode 4 is performed (the first electroplating). At this time, the color (the first color) of the electroplating to be deposited varies, depending on the composition of the electrode 2 or the composition of the electrolytic solution 3. For example, when the electrode 2 is ITO and the electrolytic solution 3 is a silver ion solution, black electroplating can be performed, and from the obverse side, the color black can be visually recognized. This corresponds to the first mode.

Furthermore, when a current is supplied by employing the electrode 4 as a negative electrode and the electrodes 2 and 5 as positive electrodes, metal ions suspended in the electrolytic solution 3 are deposited on the surface of the electrode 4 through electrolytic reduction, and electroplating of the electrode 4 (the second electroplating) is performed. At this time, the color (the second color) of the electroplating to be deposited varies, depending on the composition of the electrode 4 or the composition of the electrolytic solution 3. For example, when the electrode 4 is TiN and the electrolytic solution 3 is a silver ion solution, white electroplating can be performed, and from the obverse side, the color white can be visually recognized. This corresponds to the second mode.

When a current is supplied by employing the electrode 5 as a negative electrode and the electrodes 2 and 4 as positive electrodes, metal ions suspended in the electrolytic solution 3 are deposited on the surface of the electrode 5 through electrolytic reduction, and the electroplating of the electrode 5 (the third electroplating) is performed. At this time, the electroplating deposited on the surfaces of the electrodes 2 and 4 is completely dissolved, and the electrodes 2 and 4 are exposed. Therefore, from the obverse side, the color of the electrode 4 can be visually recognized. This corresponds to the third mode.

Figure 9:
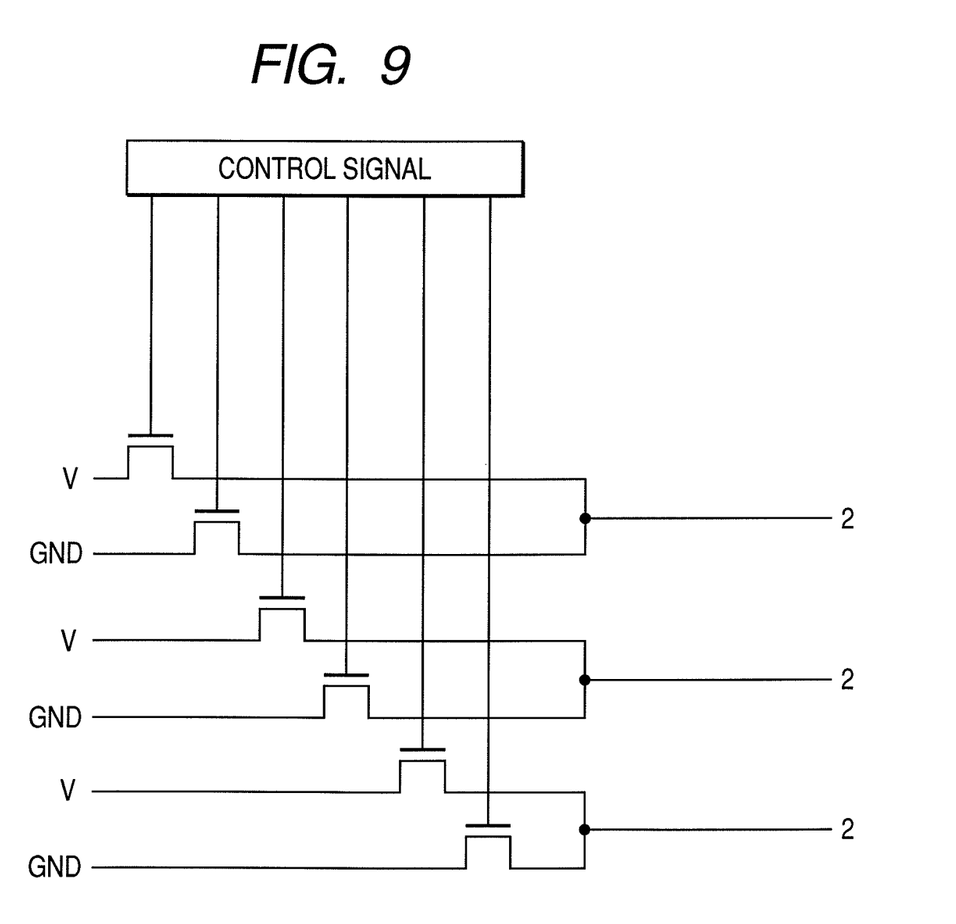
FIG. 9 is a circuit diagram illustrating a control circuit for controlling a current flow direction.
Figure 10:
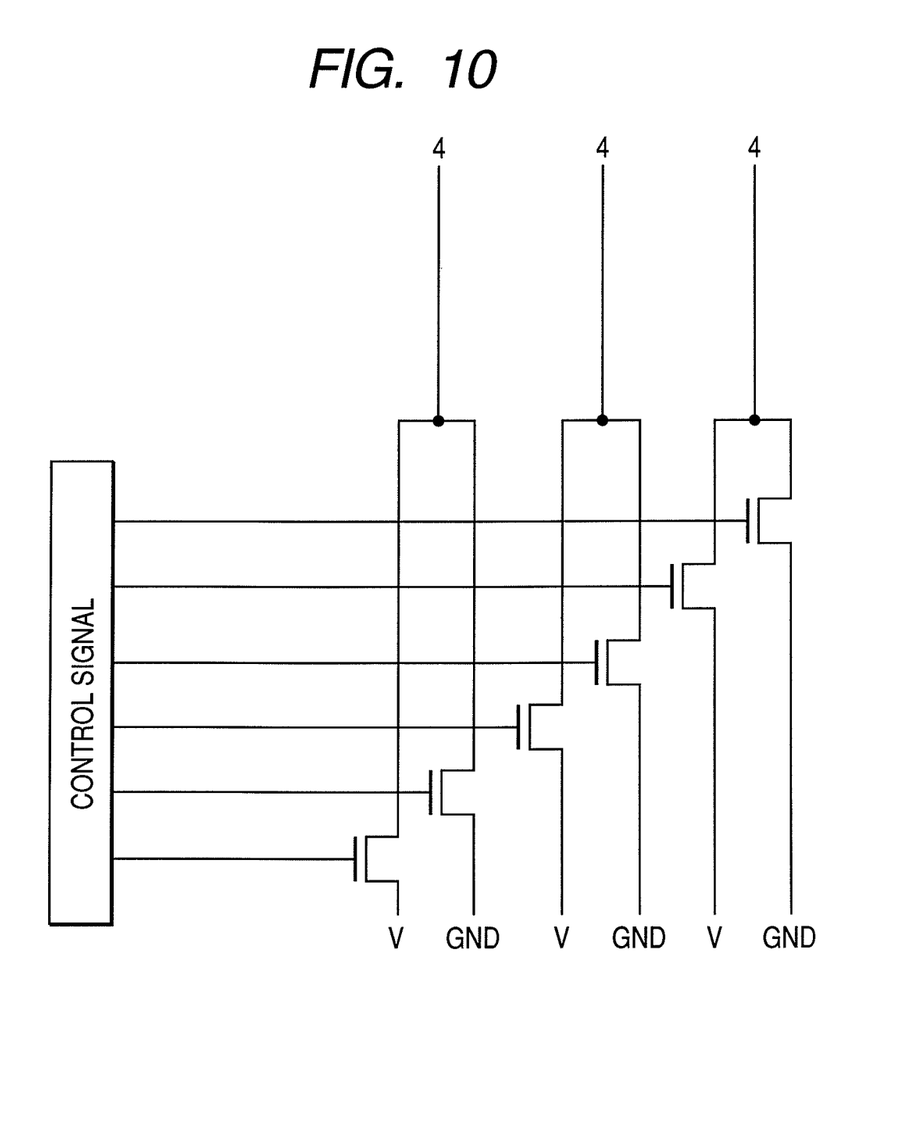
FIG. 10 is a circuit diagram illustrating the control circuit for controlling the current flow direction.
Figure 11:
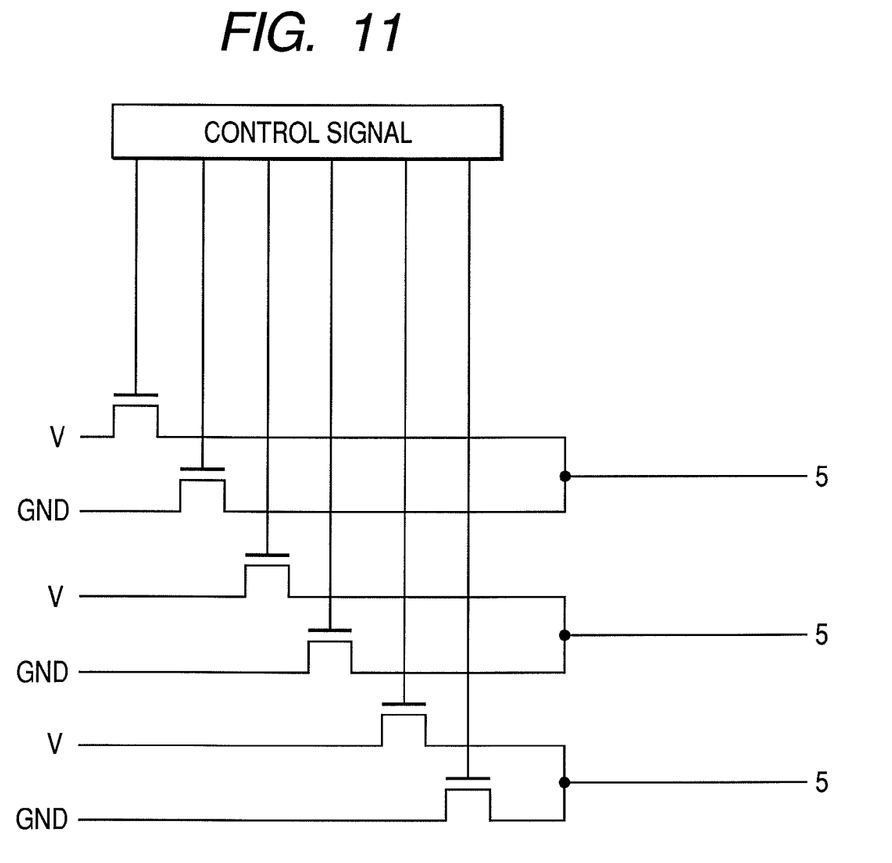
FIG. 11 is a circuit diagram illustrating the control circuit for controlling the current flow direction.

The above described operation can be performed using a control circuit (which serves as a control unit) that controls the direction in which a current flows between the three electrodes illustrated in FIGS. 9, 10 and 11, and that selectively applies two types of voltages to the electrodes 2, 4 and 5 shown therein. Specifically, when a current is to be supplied by employing the electrode 2 as a negative electrode and the electrodes 4 and 5 as positive electrodes, GND is set for the electrode 2 and a voltage V is set for the electrodes 4 and 5. Then, when a current is to be supplied by employing the electrode 4 as a negative electrode and the electrodes 2 and 5 as positive electrodes, GND is set for the electrode 4 and a voltage V is set for the electrodes 2 and 5. And when a current is to be supplied by employing the electrode 5 as a negative electrode and the electrodes 2 and 4 as positive electrodes, GND is set for the electrode 5 and a voltage V is set for the electrodes 2 and 4.

The color of a material may be employed to present the electrode 4, or the color of light selectively reflected by a laminated structure may be employed. For example, when the electrode 4 is formed by laminating TiN, Al and Cu, the reflected color can be controlled using the film thickness of the TiN.

The same effects can be obtained when an electrode 4 is made of a transparent material and a colored material is arranged on the side of the supporting substrate 6 opposite the side where the electrode 4 faces the electrode 2.

In the above description, the color of electroplating is defined in accordance with the material used for an electrode. However, the current density can be employed to control the color of electroplating. For example, when an electrode is made of ITO and is electroplated using zinc at a low current density, such as 30 mA/cm$^2$, white electroplating is deposited. On the other hand, when this electrode is electroplated at a current density of 100 mA/cm$^2$, black electroplating is deposited. When this phenomenon is employed, black electroplating can be formed on the electrode 2, and white electroplating can be formed on the electrode 4.

This phenomenon will be described based on the concept concerning a limiting current density. Referring to an electric double layer on the surface of an electrode that is in contact with an electroplating liquid, the metal ion density in the electric double layer is determined in accordance with a balance between the consumption of ions caused by electrolytic extraction and the supply through diffusion of ions suspended in the solution. The ion consumption speed is proportional to the current density, and at a very low current density, since the supply of ions through diffusion is superior to ion consumption, many ions are present near the surface of the electrode, and electrolytic deposition is performed beginning with the site whereat the surface energy of electroplating becomes extremely small. As a result, the electroplating is smoothed and presents a color white when the metal is white. On the other hand, at a specified current density, the ion consumption speed is equal to the supply speed. This current density is called a limiting current density. At the limiting current density, the ion density in the electric double layer becomes almost zero, and the electric double layer is constantly in an ion shortage state. Therefore, ions supplied through diffusion are immediately deposited, without the selection of a deposition site being permitted. As a result, the electroplating is thin, and the color becomes black. The phenomenon wherein the color becomes black also occurs at a current density very near the limiting current density.

Whether or not the current density approaches the limiting current density can be determined by monitoring the color. When the current density is gradually increased to near the limiting current density, the electroplating becomes rough, and accordingly, the color is darkened. The current density at which the color of the electroplating becomes black can be determined to be the limiting current density or a current density that is near that limit. In this manner, the change in the color for monitoring the limiting current density can be visually identified, and further, can be quantized by measuring reflectance. When the current density continues to increase after the electroplating becomes black, electroplating no longer occurs, and powder is generated in the liquid. Therefore, when the color black is employed for electroplating, it is preferable that a value be set for a current density that is equal to, or less than a value that is not near the limiting current density.

When the current density is changed in this manner, white and black electroplating can be performed. That is, when the electrodes 2 and 4 are made of ITO, and when a current is supplied at a diffusion limit current density, or at a similar current density, by employing the electrode 2 as a negative electrode and employing the electrodes 4 and 5 as a positive electrode, electroplating is applied to the electrode 2, and the surface becomes black. On the other hand, when the electrode 4 is employed as a negative electrode and the electrodes 2 and 5 are employed as positive electrodes, and a current is supplied at a current density much lower than that of the limiting current density, the surface becomes white when electroplating is applied to the electrode 4.

In this operation, when a current is to be supplied by using the electrode 2 as a negative electrode and the electrodes 4 as positive electrodes, GND is set for the electrode 2 and a voltage V2 is set for the electrodes 4 and 5. When the electrode 4 is employed as a negative electrode and the electrodes 2 and 5 are employed as positive electrodes to supply a current, GND is set for the electrode 4 and a voltage V1, which is lower than V2 (V1<V2), is set for the electrodes 2 and 5. And when a current is to be supplied by employing the electrode 5 as a negative electrode and the electrodes 2 and 4 as positive electrodes, GND is set for the electrode 5 and a voltage V1 or V2 is set for the electrodes 2 and 4.

For electroplating that is to be applied to the surface of the electrode 2 or 4, or is to be removed by dissolution thereon, when the film thickness is adjusted, the electroplating provides a function for controlling either light transmittance or reflectance. In the following example, black electroplating is applied to the surface of the electrode 2 and is called a first light modulating layer that is used to adjust light absorptance within a range of 0 to 100%, while white electroplating is applied to the surface of the electrode 4 and is called a second light modulating layer for adjusting light reflectance within a range of 0 to 100%.

In a case wherein metal electrolytically extracted by electroplating differs from a material used for an electrode where the electroplating is applied, when a voltage is externally applied, not only are metal ions deposited on an operating electrode through electrolytic reduction, but also, negative ions suspended in a solution are oxidized and deposited on the opposed electrode. Therefore, when the application of the voltage is halted and the electrodes are in a floating state, reduction-oxidation reactions occur between these electrodes, and metal ions are again dissolved in the solution. Thus, in order to maintain the display state, the external application of the voltage must be continued, and the power consumed during the display would be increased. In this embodiment, to resolve this problem, the same metal elements as those deposited by the electroplating are included in at least one of the electrodes 2, 4 and 5. For example, since the electrolytic solution 3 is a silver ion solution and the third electrode 5 is made of silver, when application of a voltage is halted and the electrodes are electrically transferred to the floating state, the deposition state is still maintained without causing any reduction-oxidation reactions. That is, since the third electrode, which contains metal to be extracted by electrodeposition, is employed as a positive electrode for electrodeposition, the metal of the third electrode is oxidized and dissolved, and therefore, electrodeposition of negative ions suspended in the solution can be inhibited. Thus, there is no reaction other than the dissolving of metal from the positive electrode and the electrodeposition on the negative electrode, i.e., there is no side reaction such as the generation of bubbles at the positive electrode, and chemically stable states are maintained at the positive and negative electrode, before and after the electroplating is deposited. Furthermore, since the third electrode contains the same metal element as the metal that is extracted by electrodeposition, the metal element plated on the first and the second electrodes is rarely dissolved again, even when the electrodes are electrically transferred to the floating state. Further, so long as the first electrode is substantially transparent, the first electrode may be formed as either a thin metal film, or may have a metal net structure or a comb tooth shaped structure, and may contain the same metal element as that deposited by the electroplating. The second electrode may also contain the same metal element as that deposited by electroplating. That is, in this embodiment, one or two or all of the first to the third elements contain the same metal elements as the metal that is deposited by electroplating.

Figure 2:
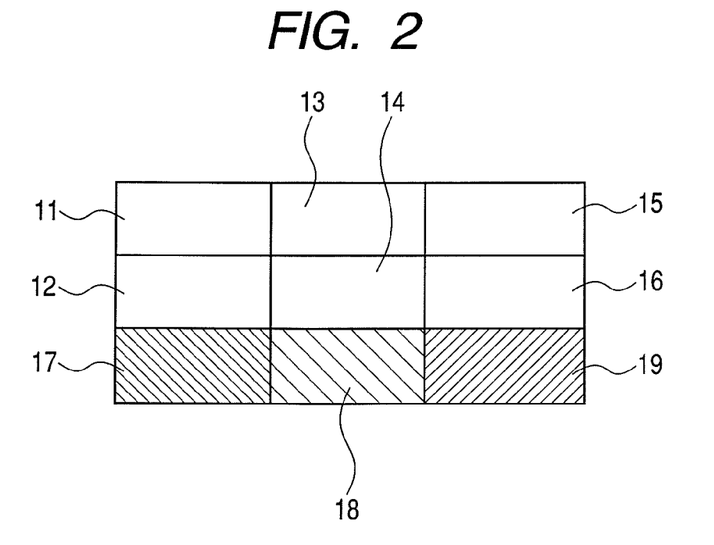
FIG. 2 is a cross-sectional view of the reflection type display apparatus of the present invention for providing full color.

FIG. 2 is a schematic diagram illustrating a full color display provided by the reflection type display apparatus of this invention. In this arrangement, reflection elements 17, 18 and 19 reflect light in red, blue and green wavelength bands.

In FIG. 2, when the electrodes 4 are employed as the reflection elements 17, 18 and 19 that reflect light in red, green and blue wavelength bands, for example, the electrodes 4 can be formed as red, blue and green reflection members using TiN/AlCu laminated film. When the electrodes 4 are transparent, a colored supporting substrate 6, or red, blue and green reflection plates need only be employed as reflection elements. An example colored supporting substrate 6 is made of a red ceramic, and in this case, a red reflection plate need not be formed on the supporting substrate, and only blue and green reflection plates must be mounted.

First light modulating layers 11, 13 and 15 adjust light absorptance within a range of 0 to 100%, and second light modulating layers 12, 14 and 16 adjust light reflectance within a range of 0 to 100%. When the light transmittance, the reflectance and the light absorptance of the first light modulating layers are respectively denoted by $T_1$, $R_1$ and $A_1$, and the light transmittance, the reflectance and the light absorptance of the second light modulating layers are respectively denoted by $T_2$, $R_2$ and $A_2$, the following expressions 1 and 2 are established.

$$T_1 = 1 - A_1 - R_1 \tag{1}$$

$$T_2 = 1 - A_2 - R_2 \tag{2}$$

Since $R_1$ to 0 and $A_2$ to 0, expressions 1 and 2 approximate expressions 3 and 4.

$$T_1 = 1 - A_1 \tag{3}$$

$$T_2 = 1 - R_2 \tag{4}$$

Figure 3:
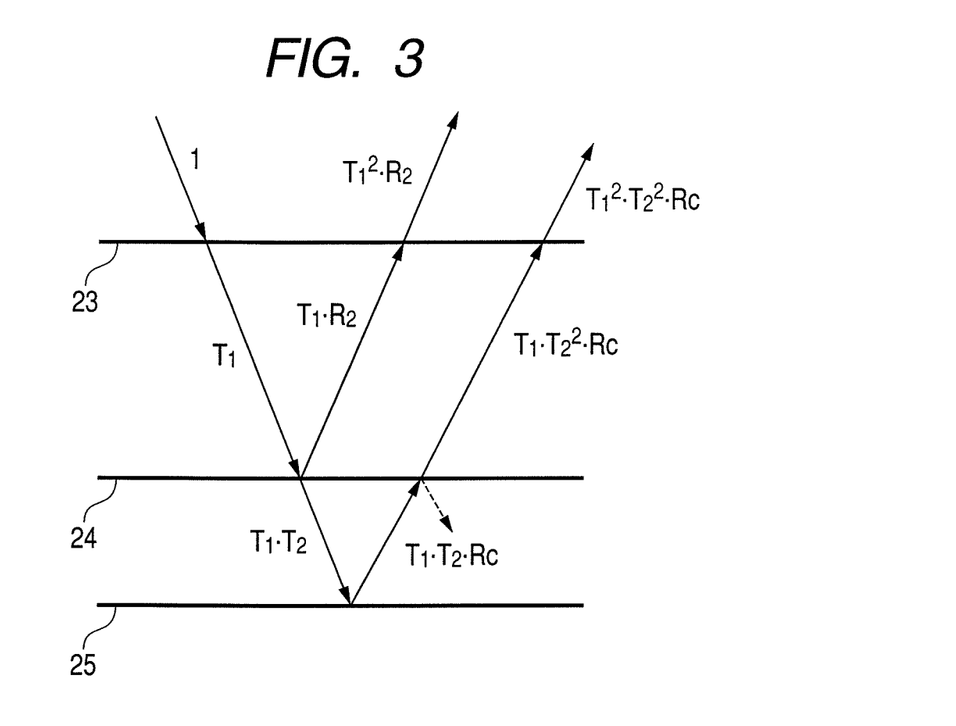
FIG. 3 is a schematic diagram illustrating the display principle of the reflection type display apparatus according to this invention.

When an incident light intensity is defined as having a value of 1 and the reflectance at a reflection element is defined as Rc, a reflected light intensity I is represented by expression 5, while multiple reflections are ignored (see FIG. 8). In FIG. 3, reflection planes 23 and 24 are those for the electroplating, i.e., the planes of the first and second light modulating layers, and a reflection plane 25 is that of a reflection element.

$$I = T_1^2 \cdot R_2 + T_1^2 \cdot T_2^2 \cdot Rc = (1 - A_1)^2 \cdot R_2 + (1 - A_1)^2 \cdot (1 - R_2)^2 \cdot Rc \tag{5}$$

With this apparatus, a color display, a black display and a white display having high reflectance can be provided. This processing will now be described.

First, the processing for displaying a specific color, such as red, will be described. The first light modulating layer 11 and the second light modulating layer 12, above the reflection element 17 that reflects a red wavelength band, are set in the light transmitting state, i.e., in the state wherein $T_1 = T_2 = 1$. Further, the first light modulating layers 13 and 15, above the reflection elements 18 and 19, that reflect blue and green wavelength bands are set in the light absorption state. At this time, the second light modulating layers 14 and 16 may be either in the reflection state or in the light transmitting state. Table 1 shows the states of the light modulating layers when Rc=0.33. In Table 1, the light absorptance of the first light modulating layer, the reflectance of the second modulating layer and the reflected light intensity I obtained by calculating expression 5 are entered for the individual pixels that include the red, green and blue reflection elements 17, 18 and 19.

TABLE 1

Table 1 States of light modulating layers for displaying red

| | | | |
|---|---|---|---|
| Absorptance $A_1$ | 0 | 1 | 1 |
| Reflectance $R_2$ | 0 | — | — |
| Reflected light Intensity I | 0.33 | 0 | 0 |
| Reflection Element | Red (Reflection Element 17) | Green (Reflection Element 18) | Blue (Reflection Element 19) |

Incident light is transmitted through the light modulating layers 11 and 12 above the reflection element 17 that reflects the red wavelength band, and red light is reflected at the reflection element 17. Since the incident light is absorbed by the light modulating layers 13 and 15, and is neither reflected nor transmitted through these layers, the blue and green pixels appear black. As a result, only the red light is reflected and a red display is presented.

Similarly, the states of the light modulating layers for displaying white are shown in Table 2. Since all the incident light is reflected by the light modulating layers to display white, the display appears white. That is, according to this invention, for a white display, the incident light is not absorbed by color filters, for example, and is reflected in its entirety, so that a high reflectance white display can be presented. The structure for displaying black is also shown in Table 3.

TABLE 2

Table 2 States of light modulating layers for displaying white

| | | | |
|---|---|---|---|
| Absorptance $A_1$ | 0 | 0 | 0 |
| Reflectance $R_2$ | 1 | 1 | 1 |
| Reflected light Intensity I | 1 | 1 | 1 |
| Reflection Element | Red (Reflection Element 17) | Green (Reflection Element 18) | Blue (Reflection Element 19) |

TABLE 3

Table 3 States of light modulating layers for displaying black

| | | | |
|---|---|---|---|
| Absorptance $A_1$ | 1 | 1 | 1 |
| Reflectance $R_2$ | — | — | — |
| Reflected light Intensity I | 0 | 0 | 0 |
| Reflection Element | Red (Reflection Element 17) | Green (Reflection Element 18) | Blue (Reflection Element 19) |

Likewise, a gradient display, from white to black, is also enabled. When the light transmittance of the light modulating layers is n (0<n<1), white at a reflectance of $n^2$, i.e., a grayish color, can be displayed by setting the states of the light modulating layers as shown in Table 4.

TABLE 4

Table 4 States of light modulating layers for changing a display from white to black at a reflectance of $n^2$

| | | | |
|---|---|---|---|
| Absorptance $A_1$ | 1 − n | 1 − n | 1 − n |
| Reflectance $R_2$ | 1 | 1 | 1 |
| Reflected light Intensity I | $n^2$ | $n^2$ | $n^2$ |
| Reflection Element | Red (Reflection Element 17) | Green (Reflection Element 18) | Blue (Reflection Element 19) |

In addition to table 4, a grayish color can be expressed with other than the $R^2=1$ value. Table 5 shows the states of light modulating layers for displaying a grayish color at a reflectance of $n^2 \times 0.33$, based on expression 5.

TABLE 5

Table 5 States of light modulating layers for changing a display from white to black for a reflectance of $n^2 \times 0.33$

| | | | |
|---|---|---|---|
| Absorptance $A_1$ | 1 − n | 1 − n | 1 − n |
| Reflectance $R_2$ | 0 | 0 | 0 |
| Reflected light Intensity I | $n^2 \times 0.33$ | $n^2 \times 0.33$ | $n^2 \times 0.33$ |
| Reflection Element | Red (Reflection Element 17) | Green (Reflection Element 18) | Blue (Reflection Element 19) |

A gradient expression for a specific color is also available. For example, red at a reflectance of 0.33 $n^2$ can be expressed by the adjustment shown in Table 6. Table 6 provides a red display at a reflectance of 0.33 $n^2$, based on expression 5.

TABLE 6

Table 6 States of light modulating layers for displaying red at a reflectance of $0.33n^2$

| | | | |
|---|---|---|---|
| Absorptance $A_1$ | 1 − n | 1 | 1 |
| Reflectance $R_2$ | 0 | 0 | 0 |
| Reflected light Intensity I | $n^2 \times 0.33$ | 0 | 0 |
| Reflection Element | Red (Reflection Element 17) | Green (Reflection Element 18) | Blue (Reflection Element 19) |

When the above described sets are employed, a color display can be presented, and a high reflectance white display is available. It should be noted that these sets are merely examples. The present invention is not limited to these examples and many other examples may be prepared.

The pixel size for the reflection type display apparatus of this invention is not especially limited, and can be appropriately designated, as required, for an application. As an example, a pixel size of about 10 μm to several tens of mm can be set.

In this embodiment, a barrier used to separate pixels is not prepared; however, a barrier may be provided, as needed. This barrier can be so set that when a voltage applied to a pixel is a "critical voltage" or lower, the deposition of electroplating does not occur, and any deleterious affect on adjacent pixels is avoided. This is also described, for example, in Japanese Patent Application Laid-Open No. 2004-170850.

First Example

In a first example of this invention, a specific structure for the reflection type display apparatus will now be described. A 0.7 mm thick glass plate is employed for the supporting substrate 1, and a 150 nm thick ITO layer is formed, using sputtering, as the first electrode 2. As the electrolytic solution 3, a solution is prepared that employs dimethylformamide (DMF) as a solvent, and contains 500 mmol/L of silver bromide, as a plating factor, 1 mol/L of tetra-n-butyl ammonium bromide (TBAB), as a supporting electrolyte, and a brightener. The pixel size is 0.7 mm×0.7 mm, and the film thickness of the electrolytic solution 3 is 0.1 m. Further, a film is formed by laminating TiN, 30 nm thick, on AlCu, 300 nm thick, and is employed as the second electrode 4. The color of the film is yellow by an interference. Silver is employed to form the third electrode 5, and glass is employed to form the supporting substrate 6.

When a voltage of 1.5 V is applied by using the first electrode 2 as a negative electrode and the second electrode 4 and the third electrode 5 as positive electrodes, a current of 10 mA/cm$^2$ flows across the circuit and the surface of the first electrode 2 is electroplated in black. As a result, the black can be visually recognized from the obverse face. Further, when a voltage of 1.5 V is applied by using the second electrode 4 as a negative electrode and the first electrode 2 and the third electrode 5 as positive electrodes, a current of 10 mA/cm$^2$ flows across the circuit and the surface of the second electrode 4 is electroplated in white. As a result, the white can be visually recognized from the obverse face. Moreover, when a voltage of 1.5 V is applied by using the third electrode 5 as a negative electrode and the first electrode 2 and the second electrode 4 as positive electrodes, a current of 10 mA/cm$^2$ flows across the circuit and electrodeposition occurs on the third electrode 5. Thus, the electroplating on the surfaces of the electrodes 2 and 4 is removed by being dissolved and yellow, which is an interference color, can be visually recognized.

The reduction-oxidation reaction on the negative electrode side is $Ag^+ + e^- \rightarrow Ag$, and the reduction-oxidation reaction on the positive electrode side is $Ag \rightarrow Ag^+ + e^-$, and silver merely migrates between the electrodes. Therefore, even when the electrodes are placed in the floating state, it is rare for silver to be again dissolved by reduction-oxidation reactions. Since silver ions suspended in the electrolytic solution 3 are constantly at a saturated density, the migration of silver does not occur, even when no voltage is applied. Therefore, a display can be maintained for an extended period of time without there being an accompanying consumption of power, and a low power consumption display apparatus can be provided. In addition, since the silver ion density of the electrolytic solution is constantly at a saturation density, partition walls are not required between pixels, and manufacturing the display apparatus is simple.

In the first example, the transparent supporting substrate 1 for protecting the surface can be made not only of glass, but also of another transparent solid material, such as a resin. Further, when a transparent ITO electrode is employed as the second electrode 4 and a reflection plate is provided under the electrode, an arbitrary color can be displayed. In this case, a colored sheet of paper and a 0.1 mm glass plate (neither of them shown) can be laminated, in the named order, on the supporting substrate 6 for use as a reflection plate.

In addition to ITO, another conductive transparent material, such as IZO (Indium-Zinc-Oxide), zinc oxide or titanium oxide can be employed for the first electrode 2 and the second electrode 4. Also, so long as a material is substantially transparent, a thin metal film, or a metal net structure or a comb tooth shaped structure can be employed. The third electrode 5 can be formed using a pure, conductive substance having the same factor as the electroplating that is deposited, or using a mixture, an alloy, a layered compound or a complex metal, deposited by electroplating, and another substance, such as platinum, carbon, gold or ITO. Spacers 33 are formed that have arbitrary shapes, such as cylinders, spheres or quadrangular prisms, and are used to maintain a constant distance between the substrates.

Second Example

According to a second example described for this invention, the reflection plate used for the reflection type display apparatus in the first example is prepared for red, green and blue. Then, red, green and blue colored filters are arranged in a matrix along a Bayer pattern, and a reflection type display apparatus that presents a color display is obtained. The pixels may be either passive-matrix driven, using cross electrodes, or active-matrix driven, using transistors. An equivalent circuit for performing active matrix driving is illustrated in FIG. 8. Electrodes 4 and 5 are employed, as a set, for a single pixel, and the display is presented by independently driving the electrodes 4 and 5. The pixels are intended to be active-matrix driven, using a transistor. The color arrangement for the reflection plate is not limited to the Bayer arrangement, and can, instead, be formed using the three colors mentioned above. Thus, cyan, magenta and yellow may be employed. Furthermore, to drive pixels, passive-matrix driving that uses a cross electrode may be employed.

Third Example

Figure 4:
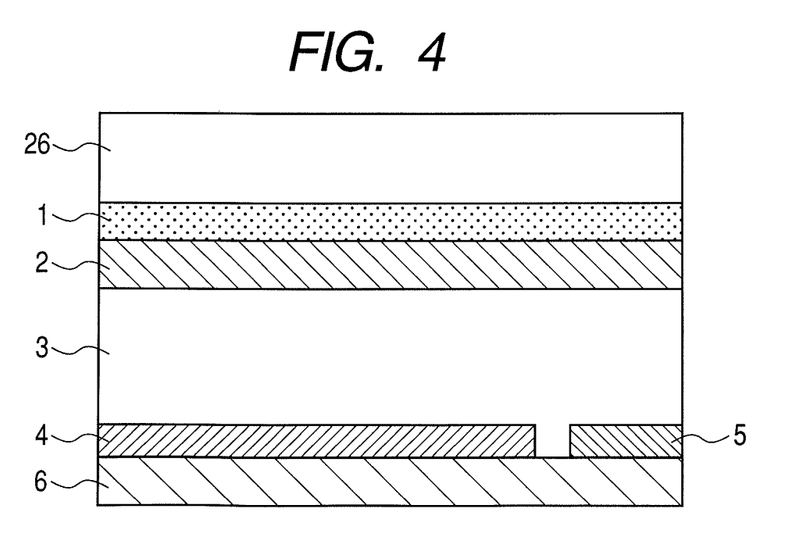
FIG. 4 is a cross-sectional view of a third example of the present invention.

FIG. 4 is a schematic cross-sectional view of the structure of a reflection type display apparatus for a third example of the invention. The third example will now be described while referring to FIG. 4. The reflection type display apparatus includes a scattering sheet 26 (a layer for scattering light) in addition to the structure in FIG. 1. With the addition of the scattering sheet 26, the viewing angle becomes greater than that available with the display apparatus in FIG. 1, so that the display more closely resembles one provided by paper, and is thus more comfortable on the eyes.

The location whereat the scattering sheet 26 is positioned is not limited to the topmost surface, and can be arbitrarily positioned, so long as it is near the surface and is separated from the electroplating. Furthermore, instead of using the scattering sheet 26, another member may also serve to perform the diffusion function. For example, the supporting substrate 1 or the first electrode 2 may provide light scatter effects.

Fourth Example

Figure 5:
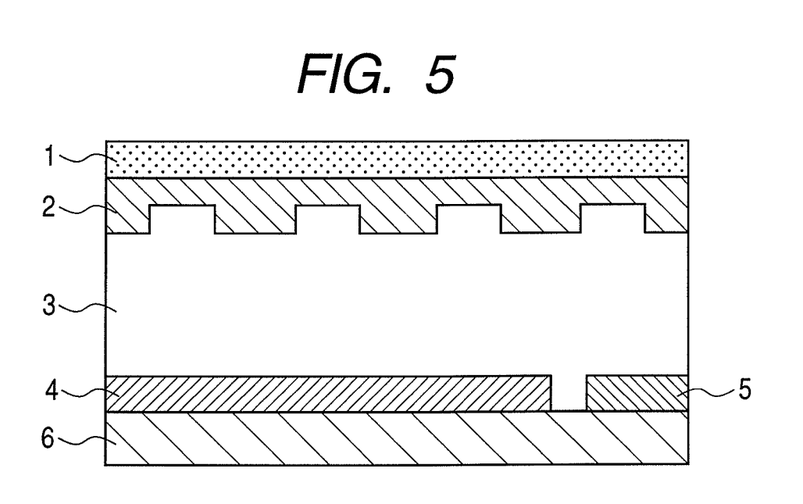
FIG. 5 is a cross-sectional view of a fourth example of the present invention.

FIG. 5 is a schematic cross-sectional view of the structure of a reflection type display apparatus of a fourth example of this invention, which will now be described while referring to FIG. 4. To obtain the same effects as in the third example, on the face of a transparent electrode 2 in FIG. 2, which is contacted by an electrolytic solution 3, a concave and convex pattern is formed at a pitch of 0.05 mm using a photolithographic process and wet etching. Other processing is performed in the same manner as in FIG. 1. When electroplating for light reflection is formed on the transparent electrode 2 having concave and convex portions, light at the concave and convex portions is scattered. And as a result, a high-quality white display, similar to that provided by paper, can be achieved. The pitch size and the arrangement of the concave and convex patterns and the electrode material are not limited to those described above, so long as the concave and convex patterns can scatter light.

Fifth Example

Figure 6:
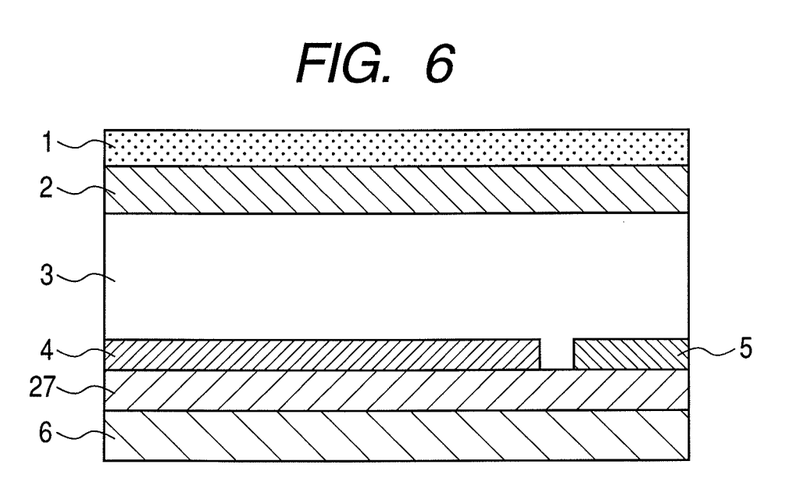
FIG. 6 is a cross-sectional view of a fifth example of the present invention.

FIG. 6 is a schematic cross-sectional view of the structure of a reflection type display apparatus according to a sixth example of this invention, which will now be described while referring to FIG. 6. The structure illustrated in FIG. 6 is the same as that in FIG. 1, except that the second electrode 4 is formed of a transparent material and a multi-layer film 27 is formed, between the supporting substrate 6 and the second electrode 4, to reflect a specific wavelength band. When films that have a thickness of n·d=m·λ/2 (n is a refractive index, d is a film thickness and m is an integer) and have different refractive indexes are laminated, relative to a wavelength λ to be reflected, selective reflection can be appropriately performed. For example, in order to appropriately reflect blue light having a wavelength of 450 nm, silica (a refractive index of 1.46), 308 nm thick, and titania (a refractive index of 2.5), 180 nm thick, need only be alternately laminated to form three layers. Further, for the reflection of green light having a wavelength of 550 nm, silica, 377 nm thick, and titania, 220 nm thick. need only be laminated to form three layers. And for the reflection of red light having a wavelength of 700 nm, silica, 479 nm thick, and titania, 280 nm thick, are laminated to form three layers. In order to provide a predetermined pixel having a desired reflection characteristic, photolithography and etching can be employed. The material and thickness of dielectric multi-layer film are not limited to those described above, and appropriate materials and thicknesses can be selected in accordance with respective wavelength bands.

Sixth Example

In a sixth example of this invention, a specific structure of a display apparatus will be described while referring to FIG. 1. A glass substrate, 0.7 mm thick, is employed as the supporting substrate 1. Further, SnO2, 800 nm thick, is laminated on an ITO film, 150 nm thick, that is formed by sputtering, and the laminated film is employed as the first electrode 2. This film is colorless and transparent. As the electrolytic solution 3, a solution is prepared that employs propylene carbonate as a solvent, and contains silver sulfate, 33.3 mmol/L, as a plating factor, tetra-n-butyl ammonium bromide (TBAB), 0.267 mol/L, as a supporting electrolyte, and a brightener. The pixel size is 0.7 mm×0.7 mm, and the film thickness of the electrolytic solution 3 is 0.1 mm. As the second electrode 4, ITO, 150 nm thick, is deposited by sputtering. Further, silver is employed for the third electrode 5, and glass is employed for the supporting substrate 6. The light transmittance of a cell obtained by laminating the first electrode 2, the electrolytic solution 3 and the second electrode 4 is 79%.

When a voltage of 1.5 V is applied, while employing the first electrode 2 as a negative electrode and the second electrode 4 and the third electrode 5 as positive electrodes, a current of 10 mA/cm$^2$ flows across the circuit and the surface of the first electrode 2 is electroplated in black. Therefore, black can be visually recognized from the obverse face. In addition, when a voltage of 1.5 V is applied, while employing the second electrode 4 as a negative electrode and the first electrode 2 and the third electrode 5 as positive electrodes, a current of 10 mA/cm$^2$ flows across the circuit and the second electrode 4 is electroplated in white. Thus, white can be visually recognized from the obverse face. Also, when a potential of 1.5 V is applied, while employing the third electrode 5 as a negative electrode and the first electrode 2 and the second electrode 4 as positive electrodes, a current of 10 mA/cm$^2$ flows across the circuit, and electroplating is deposited on the third electrode 5. Then, the electroplating on the surface of the electrodes 2 and 4 is dissolved and removed the color of an object behind the cell can be visually recognized. When a color reflection plate is arranged on the rear face, the color of the color reflection plate can be visually recognized. Since the remainder of the arrangement is the same as that in the first example, no further detailed description will be given.

Seventh Example

Also for a seventh example of this invention, a specific structure for a display apparatus will now be described while referring to FIG. 1. A glass substrate, 0.7 mm thick, is employed as the supporting substrate 1, and as the first electrode 2, an ITO film, 150 nm thick, is formed by sputtering. This film is colorless and transparent. As the electrolytic solution 3, a solution is prepared that employs propylene carbonate as a solvent, and contains silver sulfate, 33.3 mmol/L, as a plating factor, tetra-n-butyl ammonium bromide (TBAB), 0.267 mol/L, as a supporting electrolyte, urea, 50 mmol/L, and a brightener. The pixel size is 0.7 mm×0.7 mm, and the film thickness of the electrolytic solution 3 is 0.1 mm. Further, an SnO2 film, 800 nm thick, is laminated on an ITO film, 150 nm thick, deposited by sputtering, and the laminated film is employed as the second electrode 4. Silver is employed for the third electrode 5, and glass is employed for the supporting substrate 6. The light transmittance of a cell obtained by laminating the first electrode 2, the electrolytic solution 3 and the second electrode 4 is 79%.

When a voltage of 1.5 V is applied by employing the first electrode 2 as a negative electrode and the second electrode 4 and the third electrode 5 as positive electrodes, a current of 10 mA/cm$^2$ flows across the circuit, and the surface of the first electrode 2 is electroplated in white. Thus, white can be visually recognized from the obverse face. In this example, since urea is added to the electrolytic solution 3, the water resistance is improved, and white electroplating can be formed more stably. When a voltage of 1.5 V is applied by employing the second electrode 2 as a negative electrode and the first electrode 2 and the third electrode 5 as positive electrodes, a current of 10 mA/cm$^2$ flows across the circuit and the second electrode 4 is electroplated in black. Thus, black can be visually recognized from the obverse face. Moreover, when a voltage of 1.5 V is applied by employing the third electrode 5 as a negative electrode and the first electrode 2 and the second electrode 4 as positive electrodes, a current of 10 mA/cm$^2$ flows across the circuit, and electroplating is deposited on the third electrode. Then, the electroplating on the surfaces of the electrodes 2 and 4 is dissolved and removed, and the color of an object behind the cell can be visually recognized. When a color reflection plate is arranged on the reverse of the cell, the color of the color reflection plate can be visually recognized. Since the remainder of the arrangement is the same as in the first example and the sixth example, no further description will be given.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-187104, filed Jul. 18, 2007, Japanese Patent Application No. 2008-006900, filed Jan. 16, 2008, and Japanese Patent Application No. 2008-172623, filed Jul. 1, 2008 which are hereby incorporated by reference herein in their entirety.

What is claimed is:
1. A reflection type display apparatus, comprising:
an image display having a plurality of pixels, each of the pixels including a first electrode having a light transmitting property, a second electrode disposed in opposition to the first electrode, a third electrode disposed in opposition to the first or second electrode, and an electrolytic solution containing a metal ion and disposed in contact with the first, second and third electrodes; and a control unit for setting a direction of a current flowing between the first, second and third electrodes, wherein the control unit sets a) a first state of performing a first electroplating of a first color on the first electrode using the first electrode as a negative electrode and using the second electrode as a positive electrode, such that the first electroplating deposits the metal ion on the first electrode by the electrolytic reduction of the electrolytic solution, b) a second state of performing a second electroplating of a second color on the second electrode using the second electrode as the negative electrode and using the first electrode as the positive electrode without forming the first electroplating, such that the second electroplating deposits the metal ion on the second electrode by the electrolytic reduction of the electrolytic solution, and c) a third state of performing a third electroplating of a third color on the third electrode using the third electrode as the negative electrode and using the first and second electrodes as the positive electrodes without forming the first and second electroplatings, such that the third electroplating deposits the metal ion on the third electrode by the electrolytic reduction of the electrolytic solution and dissolves at least one of the films formed by the performing of the first and second electroplatings in the electrolytic solution.

2. The reflection type display apparatus according to claim 1, wherein
the control unit uses the third electrodes as positive electrodes in the first and second state, and
the colors of the first and second electroplatings are different.

3. The reflection type display apparatus according to claim 2, wherein materials of the first and second electrodes are different.

4. The reflection type display apparatus according to claim 3, wherein a density of current flowing through the first electrode is different from a density of current flowing through the second electrode.

5. The reflection type display apparatus according to claim 1, wherein the second electrode has a light transmitting property, and a reflector for reflecting radiation of a particular wavelength is disposed at a side of the second electrode opposite to a side in opposition to the first electrode.

6. The reflection type display apparatus according to claim 5, wherein the reflector comprises a multilayered dielectric film.

7. The reflection type display apparatus according to claim 1, wherein the second electrode is formed from a material reflecting a radiation of a particular wavelength band range.

8. The reflection type display apparatus according to claim 1, wherein the second electrode is disposed on a first substrate, and the first electrode is disposed on a second substrate having a light transmitting property.

9. The reflection type display apparatus according to claim 1, wherein the second electrode is disposed along a plurality of lines in one direction, and the first electrode is disposed along a plurality of lines in a direction perpendicular to the one direction so as to cross the second electrode along the plurality of lines.

10. The reflection type display apparatus according to claim 1, with the plurality of pixels each comprising:

a first switch connected to one of the first and second electrodes, wherein the one of the first and second electrodes is arranged in a matrix, and the direction of current is set by the control unit and flows through the first switch; and a second switch connected to a control terminal of the first switch for controlling turning on and off of the first switch.

11. The reflection type display apparatus according to claim 1, further comprising a light scattering layer disposed at a side of the second electrode opposite to a side in opposition to the first electrode.

12. The reflection type display apparatus according to claim 1, wherein the first electrode has a convex and concave shape for light scattering.

13. The reflection type display apparatus according to claim 1, wherein the metal ion is dissolved in the electrolytic solution and is deposited on the electrodes by electrolytic reduction conducted in the first, second, and third electroplating.

14. The reflection type display apparatus according to claim 13, wherein the metal ion is included in at least one of the electrodes.

15. The reflection type display apparatus according to claim 1, wherein the electrolytic solution is a silver ion solution.

16. A driving method of a reflection type display apparatus with an electroplating for modulating light comprising an image display having a plurality of pixels, each of the pixels including a first electrode having a light transmitting property, a second electrode disposed in opposition to the first electrode, a third electrode disposed in opposition to the first or second electrode, and an electrolytic solution containing a metal ion and disposed in contact with the first, second and third electrodes, the method comprising:

a first mode of performing a first electroplating of a first color on the first electrode using the first electrode as a negative electrode and using the second electrode as a positive electrode, such that the first electroplating deposits the metal ion on the first electrode by the electrolytic reduction of the electrolytic solution;

a second mode of performing a second electroplating of a second color on the second electrode using the second electrode as the negative electrode and using the first electrode as the positive electrodes without forming the first electroplating, such that the second electroplating deposits the metal ion on the second electrode by the electrolytic reduction of the electrolytic solution, and a third mode of performing a third electroplating of a third color on the third electrode using the third electrode as the negative electrode and using the first and second electrodes as the positive electrode without forming the first and second electroplatings, such that the third electroplating deposits the metal ion on the third electrode by the electrolytic reduction of the electrolytic solution and dissolves at least one of the films formed by the performing of the first and second electroplatings in the electrolytic solution, wherein the first, second and third modes are performed by setting a direction of a current flowing between the first, second and third electrodes.

* * * * *